United States Patent [19]

Klingle et al.

[11] Patent Number: 4,877,595

[45] Date of Patent: Oct. 31, 1989

[54] METHOD OF COMPRESSING PYROGENICALLY PREPARED SILICIC ACID

[75] Inventors: Reinhard Klingle, Wasserlos; Reinhard Manner, Dörnigheim, both of Fed. Rep. of Germany

[73] Assignee: Degussa Aktiengesellschaft, Frankfurt am Main, Fed. Rep. of Germany

[21] Appl. No.: 155,709

[22] Filed: Feb. 16, 1988

[30] Foreign Application Priority Data

Feb. 26, 1987 [DE] Fed. Rep. of Germany ....... 3706137
Dec. 10, 1987 [DE] Fed. Rep. of Germany ....... 3741846

[51] Int. Cl.$^4$ .................. C01B 33/12; C05B 19/00; A01J 21/00; B65B 1/20
[52] U.S. Cl. .................. 423/335; 23/293 R; 23/313 R; 23/313 AS; 106/482; 106/484; 425/370; 425/371; 425/372; 264/102; 141/12
[58] Field of Search .......... 23/293 R, 313 R, 313 AS; 423/335; 106/308 M, 308 Q; 425/370, 371, 372; 264/102; 141/12

[56] References Cited

U.S. PATENT DOCUMENTS

| | | | |
|---|---|---|---|
| 3,114,930 | 12/1963 | Oldham et al. | 241/68 |
| 3,632,247 | 1/1972 | Loffler et al. | 425/135 |
| 3,664,385 | 5/1972 | Carter | 141/12 |
| 3,742,566 | 7/1973 | Reinhardt et al. | 162/374 |
| 3,762,851 | 10/1973 | Reinhardt et al. | 425/223 |
| 3,860,682 | 1/1975 | Reinhardt et al. | 264/518 |
| 4,126,423 | 11/1978 | Kongsgaarden | 23/313 AS |
| 4,126,424 | 11/1978 | Kongsgaarden | 23/313 FB |
| 4,325,686 | 4/1982 | Leon et al. | 425/373 |
| 4,326,852 | 4/1982 | Kratel et al. | 141/12 |

FOREIGN PATENT DOCUMENTS

| | | |
|---|---|---|
| 1129459 | 8/1963 | Fed. Rep. of Germany . |
| 3525247 | 3/1986 | Fed. Rep. of Germany ... 23/313 AS |
| 43981 | 7/1965 | German Democratic Rep. . |

OTHER PUBLICATIONS

Perry John H. Chemical Engineers Handbook McGraw-Hill, New York, N.Y., 1950 pp. 976-978.

*Primary Examiner*—Gregory A. Heller
*Attorney, Agent, or Firm*—Cushman, Darby & Cushman

[57] ABSTRACT

Pyrogenically prepared silicic acid is compressed by a rotary filter equipped with a pressing band.

2 Claims, 1 Drawing Sheet

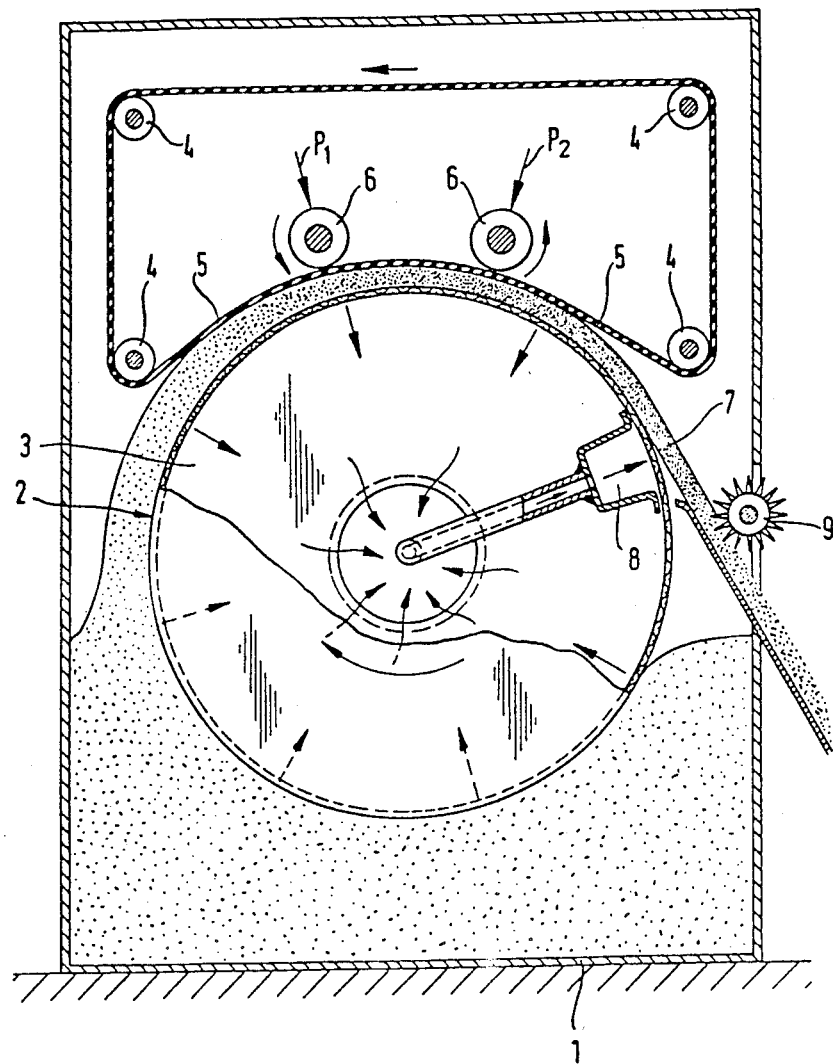

METHOD OF COMPRESSING PYROGENICALLY PREPARED SILICIC ACID

The present invention relates to a method of continuously compressing pyrogenically prepared silicic acid.

BACKGROUND OF THE INVENTION

It is known that powdery substances can be compressed by using a vacuum and mechanical pressure on rotating, gas-permeable surfaces. The entire filter surface which is not used for mechanical compression or covered with mechanically compressed material moves within a closed housing in the material to be compressed and transports the material to the compressing area. Prior to the compression, the layer density of the non-compressed material is adjusted on the roller by means of a scraper.

The compressed material is removed from the rollers by means of stripping devices and falls down for packaging (see for example German Patent Specification No. DE-AS 11 29 459).

In the case of rollers with a fabric cover, the scraper must maintain a minimum clearance from the roller surface. The scraper, for example, can not completely strip off silicic acid which has been compressed on such an apparatus.

The residual layer which remains is extremely disadvantageous. For example, it causes a not inconsiderable amount of transported material to be retained, and, in addition, the pressure difference on the rollers is so sharply reduced that the degree of compression decreases.

This known method has the disadvantage that a very strong compression is necessary to compensate for the loss of compression due to the loosening of the product on the way from the compression device to the packing machine. In order to obtain a certain degree of compression in the packaging, it is therefore necessary to apply a considerably greater compression in the compressing device. This creates the risk of losing, as a result of the great compression, the properties of the pyrogenically prepared silicic acid which render it suitable for various applications.

It is known that acetylene black can be compressed by using several pressing rollers and a circulating pressing band in conjunction with the vacuum of a rotating roller designed as a rotary vacuum drum.

The acetylene black is supplied freely flowing from above to a tapering intake slot between a rotating rotary drum provided with filter cloth and sieve jacket and under a vacuum in this section and between a rotating intake roller with circulating air-permeable, elastic pressing band, is pre-compressed and is compressed between the rotating rotary drum likewise under a vacuum in this section and between the following, elastic, nonair-permeable pressing band in conjunction with the mechanical pressure of rotating pressing rollers acting on the pressing band (DDR-PS 43981).

This known method has the disadvantage that it can not be used for the compression of pyrogenically prepared silicic acid.

Moreover, pyrogenically prepared silicic acid in a mixture with air behaves like a thin liquid, in contrast to acetylene black. Therefore, feeding of freely-flowing pyrogenic silicic acid into the intake slot of this known device causes the pyrogenic silicic acid to flow out of the device like water. A controlled compression is therefore not possible.

SUMMARY OF THE INVENTION

The object of the present invention is to provide a method for compressing pyrogenically-prepared, fine-grained silicic acid in a continuous manner. A further object is to assure that the degree of compression of the compressed product which is obtained in the compression device can be retained until the silicic acid leaves the packing device.

In accordance with the invention, pyrogenically prepared silicic acid is compressed by means of a rotary vacuum filter which is equipped with a pressing band.

In a preferred embodiment of the invention, the pyrogenically prepared silicic acid is placed in a container, and a rotary vacuum filter is movably located in this container. The rotary filter used in accordance with the invention is a known device which is commercially available and which was previously been used to separate solids from liquids.

BRIEF DESCRIPTION OF FIGURE OF DRAWING

The method of operation of the rotary filter used according to the invention and the process of the invention will be better understood from the following detailed description, reference being made to the drawing, in which:

FIG. 1 is a schematic elevation in cross-section of the apparatus used in the method of the invention.

DESCRIPTION OF PREFERRED EMBODIMENT

FIG. 1 shows a product storage container 1, which is partially filled with pyrogenically prepared silicic acid. The apparatus is provided with a horizontally mounted drum 2, the surface of which is covered with a porous filter fabric. The drum is rotated by means, not shown, about its axis. A source of vacuum (not shown) is in communication with the center of the drum 2. As can be seen from the drawing, the surface of the drum is in contact with a mass of silicic acid resting in the lower portion of the storage container 1 and, by means of the suction applied through the fabric, the drum lifts the silica, as the drum rotates.

An endless pressure belt 5 is trained about four rollers 4 above the drum and is moved by means not shown in the drawing. The belt passes under pressure rollers 6, positioned above the drum. The silicic acid lifted by the drum 2 is pressed between the drum 2 and the belt 5. The degree of compression of the silicic acid is adjusted via pretension of pressure belt 5 and especially via pressure rollers 6.

The force applied to the silica is indicated by arrows P1 and P2 in the drawing. This pressure may be applied to the rollers 6 pneumatically or hydraulically. The number of pressure rollers can vary. Preferably, 1 to 3 pressure rollers are used.

The compressed, pyrogenically prepared silicic acid 7 is removed from the filter drum at filter drum blowback zone 8 onto a chute and comminuted by spiked-wheel roller 9. The use of spiked roller 9 for comminuting the layer of compressed product is, however, not absolutely necessary.

The filter drum 2 can be operated at any desired speed, preferably at 0.1 to 10 revolutions per minute. However, the quality of the compression is not influenced by the speed but rather only the throughput amount is influenced.

The method of the invention is a continuous method in which the degree of compression which has once been achieved is maintained. A re-aeration of the compressed product does not occur.

The layer of compressed product is released from the filter drum by interrupting the vacuum. The release can be assisted by blowing off with only a slight air pressure of 0.3 bar in a direction opposite to the original direction of suction. The release of the product is complete, so that a stripping device or a discharge device is not necessary.

The filter is not affected by adhering product, since no circulating residual layer is present. This means that no undesired pressure losses occur, that is, the total pressure difference is active.

The rotary filter has a simple design. The cloth cover is inexpensive and can be replaced without disassembling the drum. No expensive sintered metal rollers are necessary.

The degree of compression may be regulated by compressed air or hydraulically and need not be regulated via the width of the roller slot.

The degree of compression of the product can be varied in a simple and rapid manner within broad limits with the same machine. A desired compression course can be adjusted by means of several pressure rollers. No isostatic storage is necessary for a constant compression. A protective, even compression occurs over the entire surface of the drum without a shearing of the product.

In a preferred embodiment of the method of the invention, a slow increase in density occurs at the entry area of the band.

The degree of compression of the product is at least as great as in the known compression methods. Surprisingly, when compressing silicic acid prepared pyrogenically by flame hydrolysis, a greater compression is obtained with the method of the invention than with known methods. As a result of the gradual increase of the compression, in contrast to the known, rapid and brief compression with high force peaks in a roller slot, a gentle increase of compression is achieved. This has the consequence that the properties of the powdery substance which render it suitable for application remain preserved to a greater extent than is the case in the known compression methods.

Silicic acid prepared pyrogenically by flame hydrolysis and compressed in accordance with the invention can be readily dispersed in silicone rubber.

In spite of the considerably greater compression of the silicic acid, the silicic acid mass exhibits the same transparency. No specks are visible.

EXAMPLES:

(a) Compression of Aerosil 200 (silo item) by means of the device of the invention:

| Stamping density achieved | 140–190 g/l |
|---|---|
| Pressure on pressing rollers | 0–8 bar |
| Number of pressing rollers | 3 |

With conventional roller compression, a stamping density of only 100 g/l was achieed.

(b) Compression of Aerosil R 972 (hydrophobic) by means of the device of the invention

| Stamping density achieved | 90–120 g/l |
|---|---|

The same pressing conditions were used as in Example 1.

With a conventional roller device, a stamping density of only 64 g/l was achieved.

Aerosil 200 is a silicic acid prepared pyrogenically from $SiCl_4$ by flame hydrolysis.

Aerosil R 972 is a silicic acid prepared pyrogenically from $SiCl_4$ by flame hydrolysis and hydrophobized.

What is claimed is:

1. A method of compressing pyrogenically prepared silicic acid which comprises rotating a drum having a filter covering on its peripheral surface while the lower surface of the drum is in contact with a body of pyrogenically prepared silica, applying vacuum to the interior of the drum to draw a layer of pyrogenically prepared silica into contact with the peripheral surface of the drum, the layer of pyrogenically prepared silica being lifted from said body as the drum rotates, moving a flexible belt in an orbital path parallel with a substantial portion of the upper portion of the peripheral surface of said drum, compressing said pyrogenically prepared silica between said belt and said drum, and releasing the vacuum to separate the compressed pyrogenically prepared silicic acid from the drum.

2. A mehod of compressing pyrogenically prepared silicic acid which comprises rotating a drum having a filter covering on its peripheral surface while a surface of the drum is is contact with a body of pyrogenically prepared silicic acid, applying a vacuum to the interior of the drum to draw a layer of pyrogenically prepared silicic acid into contact with the peripheral surface of the drum, moving a flexible belt in an orbital path with a substantial portion of the surface of said drum, compressing said pyrogenically prepared silicic acid between said belt and said drum, and separating the compressed pyrogenically prepared silicic acid from the drum.

* * * * *